United States Patent
Uchida (10) Patent No.: US 8,852,810 B2
(45) Date of Patent: Oct. 7, 2014

(54) ELECTRODE COLLECTOR FOR BATTERY AND USE THEREOF

(75) Inventor: Yozo Uchida, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 279 days.

(21) Appl. No.: 12/743,892

(22) PCT Filed: Oct. 30, 2008

(86) PCT No.: PCT/JP2008/003103
§ 371 (c)(1),
(2), (4) Date: May 20, 2010

(87) PCT Pub. No.: WO2009/069250
PCT Pub. Date: Jun. 4, 2009

(65) Prior Publication Data
US 2010/0261056 A1 Oct. 14, 2010

(30) Foreign Application Priority Data
Nov. 30, 2007 (JP) .................................. 2007-310092

(51) Int. Cl.
*H01M 4/139* (2010.01)
*H01M 4/64* (2006.01)
*H01M 4/66* (2006.01)

(52) U.S. Cl.
CPC ................ *H01M 4/661* (2013.01); *Y02E 60/12* (2013.01); *H01M 4/667* (2013.01)
USPC ..................................... 429/231.95; 429/209

(58) Field of Classification Search
CPC ......... H01M 4/04–4/0497; H01M 4/66–4/669; H01M 10/052; H01M 10/0525; Y02E 60/12
USPC ................................................... 429/209–246
See application file for complete search history.

(56) References Cited

U.S. PATENT DOCUMENTS

| | | | | |
|---|---|---|---|---|
| 4,861,689 A | * | 8/1989 | Clough et al. | 429/210 |
| 5,573,554 A | * | 11/1996 | Fauteux et al. | 29/623.5 |
| 5,591,544 A | * | 1/1997 | Fauteux et al. | 429/209 |
| 6,040,087 A | * | 3/2000 | Kawakami | 429/218.1 |

(Continued)

FOREIGN PATENT DOCUMENTS

| | | |
|---|---|---|
| EP | 1 391 948 A1 | 2/2004 |
| JP | 10-106585 | 4/1998 |

(Continued)

OTHER PUBLICATIONS

A. Lettington, "Applications of Diamond-Like Carbon Thin Films," Carbon, vol. 36, No. 5-6, pp. 555-560 (1998).

(Continued)

*Primary Examiner* — Raymond Alejandro
*Assistant Examiner* — Helen McDermott
(74) *Attorney, Agent, or Firm* — Finnegan, Henderson, Farabow, Garrett & Dunner, LLP (57) ABSTRACT

The electrode collector 40 for a battery provided by the present invention is an electrode collector 40 having a base 10 that mainly composed of a conductive metal such as aluminum, and a DLC film 20 covering the surface 12 of the base 10. The DLC film 20 is not thicker than 10 nm, and preferably has a hydrophilic surface on which hydrophilic functional groups are present.

9 Claims, 7 Drawing Sheets

(56) References Cited

U.S. PATENT DOCUMENTS

| | | | |
|---|---|---|---|
| 2003/0129497 A1 | 7/2003 | Yamamoto et al. | |
| 2003/0138701 A1* | 7/2003 | Tsukiashi et al. | 429/250 |
| 2004/0005502 A1* | 1/2004 | Schlag | 429/245 |
| 2005/0221185 A1* | 10/2005 | Sakata et al. | 429/231.8 |
| 2006/0063072 A1* | 3/2006 | Li et al. | 429/245 |

FOREIGN PATENT DOCUMENTS

| | | |
|---|---|---|
| JP | 11-250900 | 9/1999 |
| JP | 2000-11991 | 1/2000 |
| JP | 2002-352796 | 12/2002 |
| JP | 2003-272653 | 9/2003 |
| JP | 2007-131699 | 5/2007 |
| JP | 2007-265852 | 10/2007 |
| WO | WO 96/19750 | 6/1996 |
| WO | WO 99/51973 | 10/1999 |

OTHER PUBLICATIONS

Notification of Reasons for Refusal for JP Appl. No. 2007-310092 dated Mar. 8, 2012.

* cited by examiner

ELECTRODE COLLECTOR FOR BATTERY AND USE THEREOF

TECHNICAL FIELD

The present invention relates to an electrode collector that is used as a structural element of batteries, and to a method for producing battery electrodes employing this electrode collector. This application is a national phase application of International Application No. PCT/JP2008/003103, filed Oct. 30, 2008, and claims priority right based on Japanese Patent Application 2007-310092 filed on Nov. 30, 2007, the contents of both of which are incorporated in their entirety by reference herein.

BACKGROUND ART

Lithium ion batteries, nickel-hydrogen batteries, and other secondary cells have recently become more and more important as on-board power sources in vehicles or as power sources for personal computers and portable terminals. Lightweight lithium ion cells that provide high energy density are particularly promising as batteries suitable for use as on-board high-output power sources. One typical lithium ion cell structure is provided with electrodes having a structure in which a material capable of reversibly absorbing and releasing lithium ions (electrode active material) is formed on a conductive member (electrode collector). Examples of positive electrode active material used for the positive electrode include oxides that contain lithium and one or more transition metal elements as structural metal elements. Examples of electrode collectors used in positive electrodes (referred to below as "positive electrode collectors") include members in the form of a sheet or foil based on aluminum or an aluminum alloy. Such positive electrode collectors made of aluminum or aluminum alloy tend to oxidize and have a constant oxide film as a result of oxidation when exposed to the atmosphere. When an oxide film exists on the surface of a collector, the oxide film acts as an insulation film, resulting in the risk of greater electrical resistance between the positive electrode collector and the positive electrode active material.

It is therefore necessary to prevent the surface of collectors which have such properties from becoming corroded by electrolytic solution or the like. An example of a technique for preventing such corrosion (deterioration) is to form an anti-corrosion (corrosion resistant) covering layer (carbon layer) on the surface of the collector as described in Patent Citation 1. Other conventional techniques on the formation of carbon film include, for example, Patent Citations 2 through 4.

Patent Citation 1: Japanese Patent Application Laid-open No. H11-250900
Patent Citation 2: Japanese Patent Application Laid-open No. 2002-352796
Patent Citation 3: Japanese Patent Application Laid-open No. 2000-11991
Patent Citation 4: Japanese Patent Application Laid-open No. H10-106585

DISCLOSURE OF INVENTION

However, when the method disclosed in Patent Citation 1 is employed in an effort to form a carbon film, the resulting carbon film is a thick film consisting of diamond-like carbon (DLC), which is typically an amorphous inorganic material. Such diamond-like carbon (DLC) films have extremely low conductivity, contrarily resulting in an increase in the electrical resistance between the positive electrode collector and positive electrode active material. When the resistance between the positive electrode collector and positive electrode active material is greater, the internal resistance of the battery increases, and the battery performance (particularly the high rate properties) of batteries built using a positive electrode collector equipped with such a thick film is therefore far lower than those in which no such thick film has been formed.

In view of the foregoing, a primary object of the invention is to provide an electrode collector in which the base surface is protected and which has better collector performance in relation to the electrode mix layer. Another object of the invention is to provide a method for producing an electrode collector which allows an electrode collector having such performance to be consistently produced.

The electrode collector provided by the invention has a base that is mainly composed of a conductive metal, and a DLC film that is not thicker than 10 nm covering the surface of the base. Such an electrode collector structure will allow a DLC film that is firm and has excellent corrosion resistance to be used as a protective covering on the base.

Also, the DLC film of the electrode collector disclosed herein is not thicker than 10 nm, affording exceptional tunneling effects in the DLC film. It is therefore possible to ensure high conductivity even with DLC films which usually have low conductivity. The present invention therefore provides an electrode collector in which the base surface is protected by the DLC film, and which has better collector performance in terms of the electrode mix layer (layer including the electrode active material).

In a preferred embodiment of the electrode collector disclosed herein, the DLC film has a hydrophilic surface on which hydrophilic functional groups are present. The presence of hydrophilic functional groups allows the surface of the DLC film, which is generally hydrophobic, to be rendered hydrophilic. The composition for forming an electrode mix layer thus exhibits good conformability to the DLC film when the composition for forming an electrode mix layer (typically an electrode mix in the form of a paste comprising a powdered electrode active material or the like dispersed in a dispersion medium) is applied to the electrode collector. It is thus possible to prevent the electrode mix layer that is obtained after drying from drifting off or falling off of the electrode collector. The present invention can thus provide an electrode collector having good adhesion (adhesive strength) in terms of the electrode mix layer.

The hydrophilic functional groups are preferably polar functional groups containing nitrogen atoms. The polar functional groups containing nitrogen atoms have especially preferably at least one selected from the group consisting of amide groups, amino groups, and imide groups. Polar functional groups containing nitrogen atoms can be introduced into the surface of the DLC film with virtually no wear on the DLC film. It is thus possible to prevent thinning or loss of the DLC film as a result of the addition of the above polar functional groups.

In a preferred embodiment of the electrode collector disclosed herein, the conductive metal is aluminum or an aluminum alloy. Aluminum and aluminum alloys are susceptible to corrosion. The structure of the invention which involves the formation of a DLC film protecting the base is therefore particularly effective for electrode collectors in which the electrode collector base is made of aluminum or an aluminum alloy (typically the positive electrode collector).

The present invention also provides a method for producing an electrode collector for a battery. The method includes a step of preparing a base that is mainly composed of a conductive metal, a step of forming a DLC film not thicker than 10 nm on the surface of the prepared base, and a step of surface treating the surface of the DLC film, which has been formed, to render the surface hydrophilic. This method can effectively provide an electrode collector in which the base surface is protected by a DLC film, and which has better collector performance in terms of the electrode mix layer (layer including the electrode active material).

In a preferred embodiment of the production method disclosed herein, the DLC film is formed by physical deposition or chemical deposition of carbon on the base in the film-forming step. Sputtering is preferably used, for example, for the physical deposition. The use of solid carbon as the target when forming the film by sputtering will allow an extremely durable DLC film to be obtained with a low hydrogen content. It will also effectively clean off impurities such as rolling oil that may adhere to the base surface during sputtering.

In a preferred embodiment of the production method disclosed herein, polar functional groups containing nitrogen atoms are introduced as the hydrophilic functional groups on the surface of the DLC film in the surface treatment step. At least one selected from the group consisting of amide groups, amino groups, and imide groups is preferably introduced as the polar functional group with a nitrogen atom. Polar functional groups containing nitrogen atoms can be introduced, for example, by providing nitrogen-containing chemical species (such as nitrogen gas, nitrogen radicals, and nitrogen plasma) to the surface of the DLC film. Since nitrogen-containing chemical species (such as nitrogen gas, nitrogen radicals, and nitrogen plasma) are less effective for etching than oxygen-containing chemical species (such as oxygen gas, oxygen radicals, and oxygen plasma), polar functional groups containing nitrogen atoms can be introduced with virtually no wear of the DLC film. It is thus possible to prevent thinning or loss of the DLC film as a result of the addition of the above polar functional groups. As a result, an electrode collector with a hydrophilized DLC film can be consistently produced.

The invention also provides a method for producing a battery electrode with a structure in which an electrode mix containing an electrode active material is retained on the electrode collector. This method includes a step of preparing any one of the above electrode collectors, and a step of preparing a composition for forming an electrode mix layer that includes the electrode active material and a dispersion medium, and applying the composition onto the surface of the DLC film to form an electrode mix layer. According to this method, the DLC film is formed, and the surface of the DLC film is then subjected to a hydrophilization surface treatment to improve the "wettability" of the DLC film with respect to the composition for forming an electrode mix layer, and the composition for forming the electrode mix layer is then provided on the hydrophilic surface of the DLC film which has undergone the hydrophilization surface treatment. This will result in a composition for forming an electrode mix layer having better conformability to the DLC film, and can prevent the electrode mix layer that is obtained after drying from drifting off or falling off of the electrode collector. A battery electrode with better battery performance can therefore be consistently produced (with consistent quality).

The composition for forming the electrode mix layer is preferably an aqueous composition involving the use of an aqueous medium as the dispersion medium in the interests of alleviating the burden on the environment, reducing material consumption, simplifying the equipment that is used, reducing waste, improving handling, and the like. When such an aqueous composition includes lithium-transition metal compound oxides, the lithium ions forming the oxide are eluted in the aqueous medium, resulting in alkalinity, but according to the method of the invention, the DLC film functions as a protective film, allowing reactions (typically corrosive reaction with alkalis) with the aqueous composition to be prevented.

Either of the methods disclosed herein will be particularly suitable for cases in which the conductive metal forming the base is aluminum or an aluminum alloy. Aluminum and aluminum alloys have a variety of desirable properties as electrode collectors (particularly the positive electrode collector) in lithium secondary cells (batteries) and other non-aqueous electrolytic secondary cells (batteries), but are also susceptible to corrosion or oxidation due to the composition for forming the electrode mix layer. Adopting the structure of the invention in which the composition for forming the electrode mix layer is applied after the formation of the DLC film on the surface of the base to prevent the corrosion of the base will therefore be particularly effective in methods for producing an electrode collector (typically the positive electrode collector) in which the electrode collector base is made of aluminum or an aluminum alloy.

The invention also provides a battery (typically a secondary cell, particularly a lithium secondary cell) which has been built in use of any of the above electrode collectors disclosed herein. Such cells built using the above electrode collector for at least one electrode (preferably the positive electrode) will exhibit better battery performance. For example, it is possible to provide a secondary cell such as a lithium secondary cell having better high rate properties (cells with less of a decrease in discharge properties even when rapidly charged with greater current) by building the cell using the above electrode collector.

BEST MODE FOR CARRYING OUT THE INVENTION

Embodiments of the present invention are described below with reference to the attached drawings. In the figures, the same symbols are used for members and sites that have the same functions. Dimensional relationships (such as length, width, and thickness) in the figures do not reflect actual dimensional relationships. Matters which are not specifically mentioned in the Specification but which are necessary to working the invention (such as common techniques relating to the production of electrode active materials, the preparation of compositions for forming electrode mix layers, the structures and production of separators or electrolytes, and the construction of lithium secondary cells and other cells) will be understood as matters of design by persons with ordinary skill in the art based on the prior art in the field.

The positive electrode collector and battery positive electrode (positive electrode sheet) in these embodiments are described below, with reference to the schematic cross section in FIG. 1, as examples of, but are not particularly limited to, positive electrode collectors for lithium secondary cells (typically lithium ion cells) having primarily a base in the form of foil made of aluminum (aluminum foil) and battery positive electrodes (positive electrode sheets) equipped with such a positive electrode collector.

Figure 1:
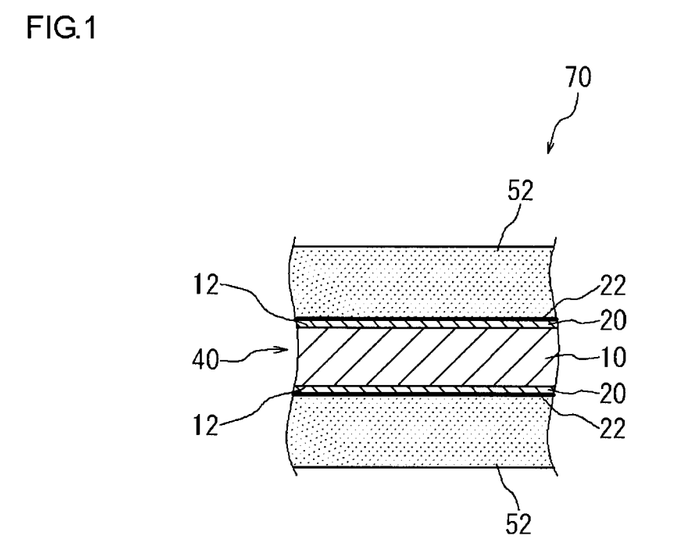
FIG. 1 is a schematic cross section of a positive electrode for a lithium secondary cell in one embodiment of the invention.

As illustrated in FIG. 1, the positive electrode 70 for a lithium secondary cell disclosed herein is composed of a positive electrode collector 40, and a positive electrode mix layer 52 supported by the positive electrode collector 40. Generally speaking, the positive electrode collector 40 is composed of a base 10 that is based on a conductive metal, a DLC film 20 covering the surface 12 of the base 10, and a hydrophilic surface 22 formed on the surface of the DLC film 20.

The base 10 is formed primarily of a conductive metal. The base 10 is preferably made of a metal with good conductivity (for example, a metal such as aluminum, nickel, copper, or iron, or an alloy based on such metals). In this embodiment, the base is aluminum foil about 10 micrometers (um) to 30 micrometers (um) thick.

The DLC film (DLC layer) 20 covers the surface 12 of the base 10.

In this Specification, the DLC film is an abbreviation for diamond-like carbon film, and is not particularly limited in the sense of a technical term commonly used in the relevant technical field, that is, an amorphous carbon film formed with or without hydrogen. The structure of the DLC film should be an amorphous structure including both a diamond structure (spa bond) and a graphite structure ($sp^2$ bond), where no particular limitations are imposed on the proportions in which they are mixed, whether or not hydrogen is contained, or what the content is. The proportion in which the diamond structure and graphite structure are mixed as well as the hydrogen content can be adjusted as desired according to the structural conditions of the electrode (such as the desired DLC film hardness).

The DLC film 20 thickness (film thickness) is no more than 10 nm and preferably no more than 2 nm. The DLC film 20 is no more than 10 nm thick to bring about tunneling effects in the DLC film 20. It is thus possible to ensure high conductivity despite the generally low conductivity of DLC films. The minimum thickness of the DLC film 20 should be enough to allow the surface of the base to be covered without any gaps by the DLC film 20, and the thickness is preferably at least 4 carbon atoms. This will allow the surface of the base to be covered without any loss of the protective function of the DLC film 20. The DLC film 20 thickness can range from about 0.8 nm to 10 nm, and usually is preferably about 1 nm to 2 nm.

Such a DLC film 20 is generally substantially devoid of polar functional group and is thus hydrophobic, with a surface that is water-repellent. In the present embodiment, the surface of the DLC film 20 undergoes a hydrophilization treatment to modify the surface and increase the hydrophilicity. That is, the DLC film 20 has a hydrophilic surface 22 as a result of hydrophilization treatment of the surface. As a typical example of such a hydrophilization treatment, treatment for introducing polar functional groups into the DLC film 20 can preferably be used. In the present embodiment, polar functional groups containing nitrogen atoms (N) is introduced into the film surface 22. Examples of polar functional groups containing nitrogen atoms (N) include amide groups, amino groups, and imide groups.

The positive electrode active layer 52 is formed on the hydrophilic surface 22. The positive electrode mix layer 52 is composed of the positive electrode active material and other ingredients for forming the positive electrode active mix that are used as needed (such as conductive materials or binders). The positive electrode active material is preferably based on a lithium-transition metal compound oxide which includes lithium and ore or more transition metal elements as structural metal elements. Typical desirable examples of such lithium-transition metal compounds oxides include lithium-nickel compound oxides, lithium-cobalt compound oxides, and lithium-manganese compound oxides.

According to the structure of the electrode collector 40 in this embodiment, a firm DLC film 20 with good corrosion resistance (such as oxidation resistance) can be used as the protective film of the base 10. The DLC film 20 is furthermore no more than 10 nm so as to bring about extensive tunneling effects in the DLC film 20, thereby ensuring high conductivity despite the generally low conductivity of DLC films. It is thus possible to provide an electrode collector 40 in which the surface of the base 10 is firmly protected by the DLC film 20 and which has good collector performance in terms of the positive electrode mix layer 52 (layer including the electrode active material).

Because the DLC film 20 has a hydrophilic surface 22 on which hydrophilic functional groups are present, the presence of the hydrophilic functional groups (polar functional groups) allows the surface of the DLC film 20, which is generally hydrophobic, to be rendered hydrophilic. The composition 50 for forming an electrode mix layer thus exhibits good conformability to the DLC film 20 when the composition 50 (FIG. 3D) for forming an electrode mix layer is applied to the electrode collector 40. It is thus possible to prevent the electrode mix layer 52 that is obtained after drying from drifting off or falling off of the electrode collector 40. It is thus possible to provide an electrode collector 40 having good adhesion (adhesive strength) in terms of the electrode mix layer 52.

The method for producing the electrode collector (positive electrode collector) and battery electrode (positive electrode sheet) in this embodiment will be described next, with reference to FIGS. 2 and 3A through 3E.

Figure 2:
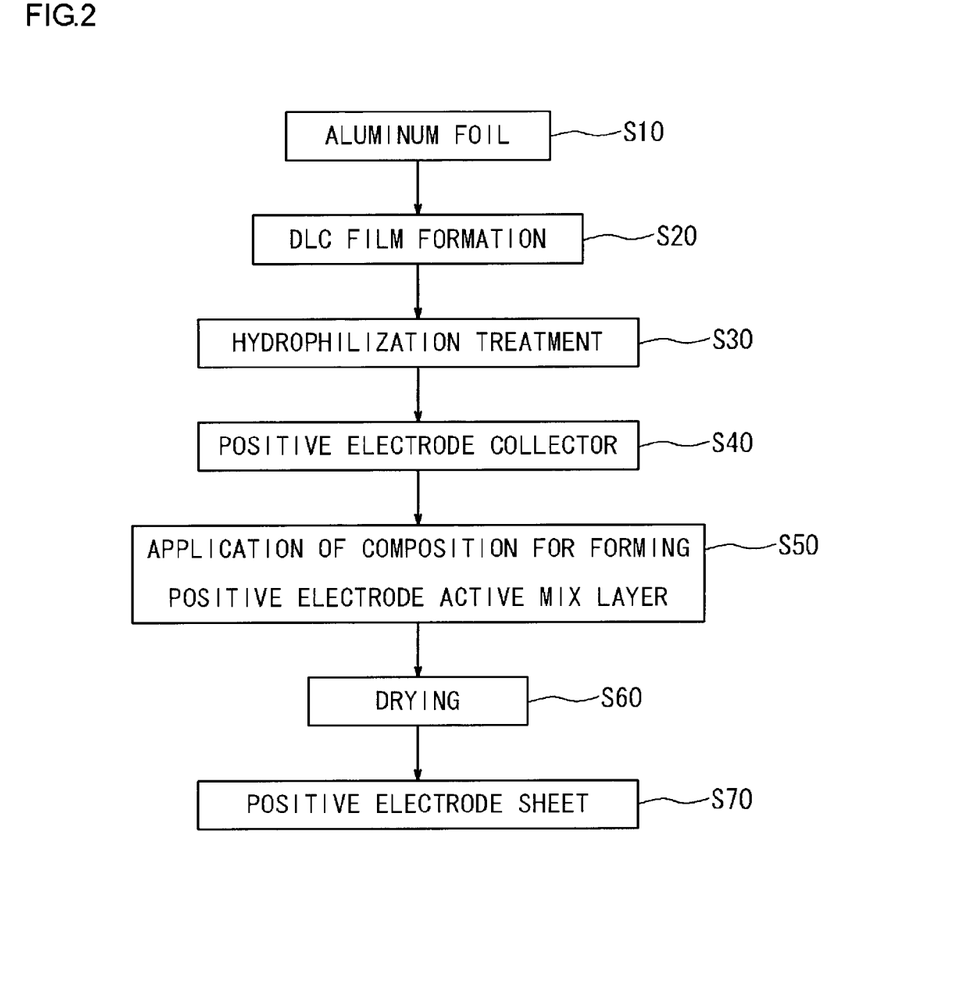
FIG. 2 is a flow chart of the steps in the process for manufacturing the lithium secondary cell in one embodiment of the invention.

Generally speaking, as shown in FIG. 2, a base that is based on conductive metal is first prepared (Step S10), and a DLC film no more than 10 nm is then formed on the surface of the base that has been prepared (Step S20). The surface of the DLC film that has been formed is then subjected to surface treatment so as to be rendered hydrophilic (Step S30), giving a positive electrode collector having a hydrophilic surface (Step S40). A composition for forming the positive electrode mix layer containing the positive electrode active material and a dispersion medium is then prepared, and the composition is applied to the surface of the DLC film (Step S50). The composition for forming the positive electrode active mix is then dried to remove the dispersion medium (Step S60), and the positive electrode mix layer containing the positive electrode active material is formed on the positive electrode collector (Step S70).

Figure 3A:
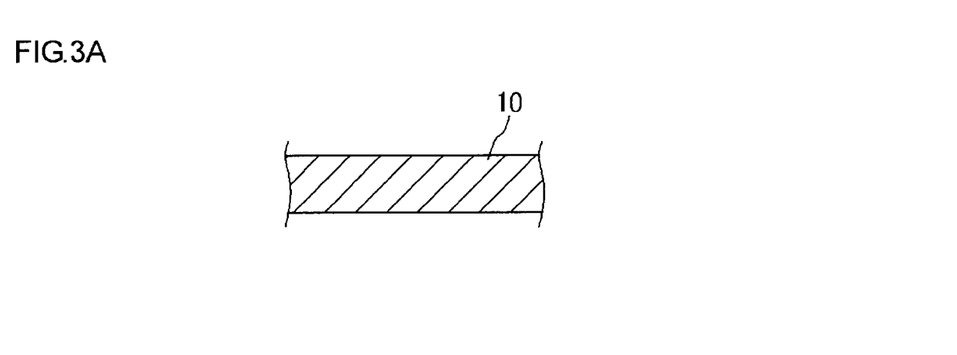
FIG. 3A is a cross section of a step in the process for manufacturing the lithium secondary cell in one embodiment of the invention.

The description will be further elaborated below using the cross sections of the steps in FIGS. 3A through 3E. In this embodiment, as illustrated in FIG. 3A, a base that is based on a conductive metal (here, aluminum foil) 10 is first prepared (such as produced or purchased) (Step S10 in FIG. 2).

Figure 3B:
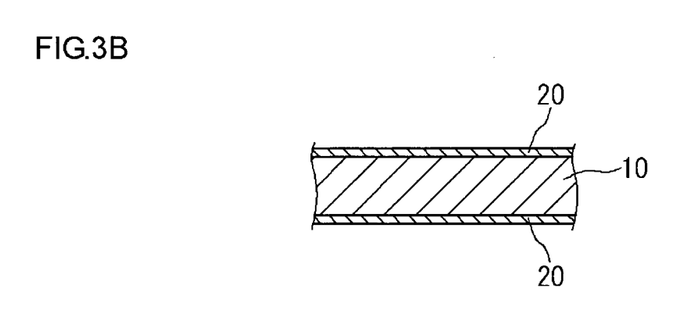
FIG. 3B is a cross section of a step in the process for manufacturing the lithium secondary cell in one embodiment of the invention.

Then, as illustrated in FIG. 3B, the DLC film 20 is formed to no more than 10 nm on the base 10 that has been prepared (Step S20 in FIG. 2). The DLC film 20 is formed by the deposition of carbon on the base 10.

A well known method of deposition such as physical deposition (PVD) or chemical deposition (CVD) can preferably be used as the method for the deposition of the DLC film 20. For example, the DLC film 20 can be deposited by sputtering, which is a type of physical deposition. Solid carbon can be used as the target in deposition by sputtering to form a very hard DLC film with a low hydrogen content. Impurities such as calendaring oil adhering to the surface of the base can also be effectively washed off during sputtering.

Examples of other methods of physical deposition include AIP, ion beam deposition, and cathode arc deposition. High frequency (RF) plasma CVD employing a hydrocarbon gas (such as methane, ethylene, or acetylene) as the source gas can preferably be used as the method of chemical deposition.

The thickness of the DLC film 20 can be controlled as desired by adjusting the DLC film deposition conditions. In the case of sputtering, for example, the thickness can be controlled by modifying the sputtering power and the feed rate of the base 10.

The DLC film 20 is preferably provided in such a way as to encompass at least the range where the positive electrode mix layer 52 is formed on the surface of the base 10. For example, when the positive electrode mix layer 52 is formed on only one side of the foil base 10 (either part or all of the one side), the DLC film 20 is preferably formed along the entire range on the one side. Alternatively, when the positive electrode mix layer 52 is formed on both sides of the base 10, the DLC film 20 is preferably provided along the entire range on those sides.

When the DLC film 20 is formed in this manner, the surface of the DLC film 20 is then subjected to surface treatment for hydrophilization (Step S30 in FIG. 2). In this embodiment, polar functional groups including nitrogen atoms (such as amino groups, amide groups, and imide groups) are introduced as hydrophilic functional groups onto the surface of the DLC film 20. Polar functional groups containing nitrogen atoms can be introduced, for example, by providing nitrogen-containing chemical species (such as nitrogen gas ($N_2$), nitrogen radicals, and nitrogen plasma) to the surface of the DLC film 20. Specifically, the DLC film 20 is subjected to corona discharge, plasma discharge, or the like in an atmosphere which includes nitrogen. A typical example is a treatment in which plasma discharge treatment is carried out while providing a gas mixture containing $N_2$, $H_2$, and a hydrocarbon gas (such as methane) in a volumetric ratio ($N_2:H_2$:hydrocarbon gas) of 90 to 99:5 to 0.5:5 to 0.5.

Figure 3C:
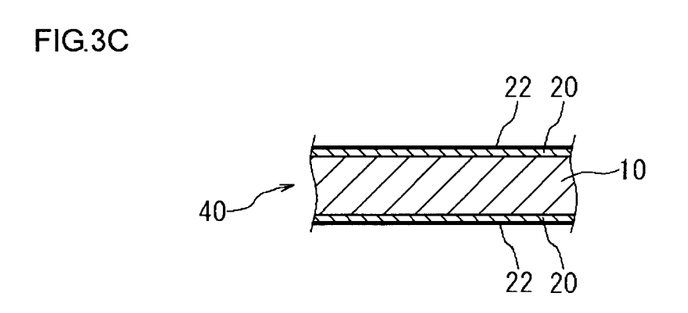
FIG. 3C is a cross section of a step in the process for manufacturing the lithium secondary cell in one embodiment of the invention.

The DLC film 20 is subjected to hydrophilization surface treatment, making it possible to obtain a positive electrode collector 40 in which the DLC film 20 having a hydrophilic surface 22 has been formed on the surface of the aluminum foil 10 (such as the entire range on both sides of the aluminum foil) in Step S40 (see FIG. 3C). The above Step S10 through Step S40 can thus be understood as a method for producing the positive electrode collector 40 or a process for preparing (producing) a positive electrode collector. It is thus possible to efficiently provide a positive electrode collector 40 in which the surface of the conductive metal base composed of aluminum or the like is firmly protected by the DLC film 20 and which has good collector performance in terms of the positive electrode mix layer (layer including the positive electrode active material).

Figure 3D:
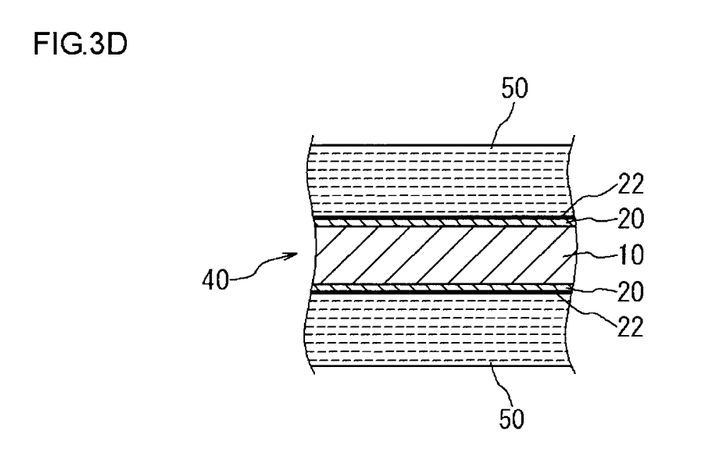
FIG. 3D is a cross section of a step in the process for manufacturing the lithium secondary cell in one embodiment of the invention.

Then, as shown in FIG. 3D, the positive electrode collector 40 that has been obtained in the manner described above is prepared, and the composition 50 for forming the positive electrode mix layer, which includes the positive electrode active material and a dispersion medium, is applied to the hydrophilic surface 22 of the DLC film 20 (Step S50 in FIG. 2).

The composition 50 for forming the positive electrode mix layer is a positive electrode active mix in the form of a paste, which is obtained by dispersing and kneading a powder of the above mentioned positive electrode active material and other ingredients for forming the positive electrode active mix (such as conductors or binders), that are used as needed, in a suitable dispersion medium. The composition 50 for forming the positive electrode mix layer is preferably an aqueous composition (aqueous paste) involving the use of an aqueous medium as the dispersion medium in the interests of alleviating the burden on the environment, reducing material consumption, simplifying the equipment that is used, reducing waste, improving handling, and the like. Water or a solvent mixture based on water is preferably used as the aqueous medium. One or more organic solvents (such as lower alcohols and lower ketones) which can be uniformly mixed with water can be suitably selected for use as the solvent component other than water forming such a solvent mixture. An aqueous solvent of which at least 80 mass % (preferably at least 90 mass %, and more preferably at least 95 mass %) is water will preferably be used, for example. Aqueous solvents composed substantially of water are particularly desirable. The operation (step) of applying (here, coating) the composition 50 for forming the positive electrode mix layer on the positive electrode collector 40 can be done in the same manner as when a positive electrode for a common conventional lithium secondary cell is produced, except for the use of the DLC film 20 having a hydrophilic surface 22 formed on the surface as the positive electrode collector 40. For example, a suitable coating means (such as a slit coater, die coater, or comma coater) can be used to allow the positive electrode collector 40 to be coated with a certain amount of the composition 50 for forming the positive electrode mix layer to a uniform thickness on top of the aforementioned hydrophilic surface 22.

The coating is then dried (typically 70 to 200 degrees Celsius) by a suitable drying means to remove the dispersion medium (such as water or other aqueous solvents) in the composition 50 for forming the positive electrode mix layer (Step S60 in FIG. 2). The removal of the dispersion medium from the composition 50 for forming the positive electrode mix layer results in the formation of the positive electrode mix layer 52 including the positive electrode active material.

Figure 3E:
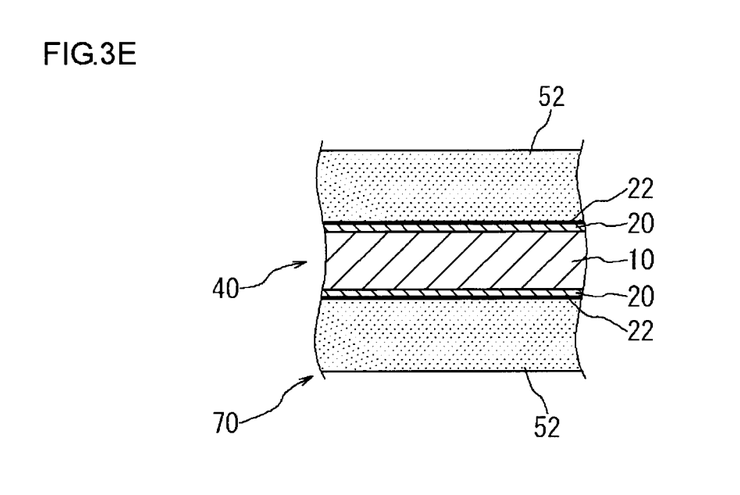
FIG. 3E is a cross section of a step in the process for manufacturing the lithium secondary cell in one embodiment of the invention.

In this way, as illustrated in FIG. 3E, a positive electrode 70 in the form of a sheet comprising the positive electrode mix layer 52 formed on the surface of the positive electrode collector 40 can be obtained (Step S70 in FIG. 2). After the drying step, a suitable pressing treatment (such as a roll pressing treatment) can be implemented as needed to suitably adjust the thickness and density of the positive electrode mix layer 52.

According to the method for producing a battery positive electrode (positive electrode sheet) in this embodiment, the DLC film 20 is formed, and the surface of the DLC film 20 is then subjected to a hydrophilization surface treatment to improve the "wettability" of the DLC film 20 with respect to the aqueous composition 50, and the aqueous composition 50 is then provided on the hydrophilic surface 22 of the DLC film 20 which has undergone the hydrophilization surface treatment. This will result in an aqueous composition 50 having better conformability to the DLC film 20, and can prevent the electrode mix layer 52 that is obtained after drying from drifting off or falling off of the positive electrode collector 40. A battery electrode 70 with better battery performance can therefore be consistently produced (with consistent quality).

In a preferred embodiment, polar functional groups containing nitrogen atoms can be introduced during the above hydrophilization surface treatment by providing nitrogen-containing chemical species (such as nitrogen has, nitrogen radicals, and nitrogen plasma) on the surface of the DLC film. For example, in addition to a nitrogen source gas such as nitrogen gas or ammonia gas, typically a hydrogen source gas such as hydrogen gas or a hydrocarbon gas or other high molecular weight gas (carbon source gas), etc. can be introduced onto the DLC film surface, and a treatment for providing energy capable of bringing about a chemical reaction, such as UV irradiation, corona discharge, or plasma treatment, can be carried out in that atmosphere to bring about hydrophilization surface treatment through reaction with the molecules contained in the above atmosphere gas.

Since nitrogen-containing chemical species (such as nitrogen gas, nitrogen radicals, and nitrogen plasma) are less effective for etching than oxygen-containing chemical species (such as oxygen gas, oxygen radicals, and oxygen plasma), polar functional groups containing nitrogen atoms can be introduced with virtually no wear of the DLC film. It is thus possible to prevent thinning or loss of the DLC film as a result of the addition of the above polar functional groups. As a result, a battery positive electrode 70 as well as a positive electrode collector 40 with a hydrophilized DLC film 20 can be consistently produced.

In a preferred embodiment of the invention, the aqueous composition 50 is applied to the positive electrode collector 40, but an aqueous composition 50 that includes lithium-transition metal compound oxides tends to become alkaline through the elution of the lithium ions which constitute the oxides into the aqueous medium. Thus, when an aqueous composition is applied to a base 10 consisting of aluminum foil or the like, the base 10 may become corroded by reaction between the composition 50 and base 10 (typically an alkali-based corrosion reaction). By contrast, according to the production method in this embodiment, the DLC film 20 functions as a protective film, making it possible to prevent reactions between the composition 50 and base 10 (typically an alkali-based corrosion reaction).

Moreover, the composition for forming the positive electrode mix layer is not limited to aqueous compositions, and may also be a non-aqueous composition. In that case, a non-aqueous medium can be used as the dispersion medium in the non-aqueous composition. Examples of non-aqueous media include organic media such as N-methyl pyrrolidone (NMP). N-methyl pyrrolidone (NMP) has polar functional groups, thus resulting in conformability to the hydrophilic surface 22 of the DLC film 20. The adhesion (adhesive strength) with the positive electrode mix layer that is obtained after drying can thus also be improved when N-methyl pyrrolidone (NMP) is used.

Polar functional groups containing oxygen atoms (such as hydroxyl groups, carboxyl groups, aldehyde groups, and keto groups) may be introduced instead of polar functional groups containing nitrogen atoms during the hydrophilization treatment of the DLC film. In that case, functional groups with oxygen atoms are introduced through the supply of chemical species containing oxygen (such as oxygen gas ($O_2$), ozone ($O_3$), oxide ions ($O^{2-}$), oxygen radicals, and oxygen plasma) to the surface of the DLC film 20. Polar functional groups with oxygen atoms can be introduced into the DLC film surface, for example, by UV irradiation, corona discharge, plasma treatment, or ozone or EB methods or the like on the DLC film in an atmosphere containing oxygen source gas species. At that time, the DLC film will become thinner (about 2 nm, for example) as a result of the etching effects of the chemical species containing the oxygen, and the DLC film may therefore be formed thicker (thicker by about 2 nm, for example) in anticipation of the thinning effects resulting from the etching.

The positive electrode collector in this embodiment has a better collector capacity in relation to the positive electrode mix layer, as noted above, and can therefore preferably be used as a structural element in various types of batteries or as a structural element of an electrode housed in such batteries. For example, it can preferably be used as a structural element in a lithium secondary cell equipped with a positive electrode having any of the positive electrode collectors disclosed herein, a negative electrode (can be a negative electrode that has a negative electrode collector produced through the application of the invention), an electrolyte disposed between the positive and negative electrodes, and typically a separator for separating the positive and negative electrodes (can be left out in batteries using a solid or gelatinous electrolyte). The size or structure of the external container forming such a battery (such as a metal frame or laminated film structure) or the structure of the electrode assembly employing the positive and negative electrode collectors as main structural elements (such as rolled structures or stacked structures), and the like are not particularly limited. Batteries built in this manner exhibit better battery performance because they include the positive electrode collector 40, wherein the surface of the base 10 is firmly protected by the DLC film 20, affording better collector performance in relation to the positive electrode mix layer 52 (layer including the electrode active material). Building a battery using the positive electrode collector described above, for example, will allow a batter with better high rate properties (battery which has less of a decrease in discharge properties even when rapidly charged with substantial current) to be provided.

The following tests were conducted as test examples to confirm that batteries with better high rate properties (such as lithium secondary cells) can be built using the positive electrode collector according to the invention.

That is, a positive electrode collector was prepared by forming a DLC film of a certain thickness (film thickness 5 nm, 10 nm) on the surface of an aluminum foil base. The DLC film was formed using a common sputtering device. The conditions for forming the DLC film included setting a constant gas pressure of 0.3 Pa through the introduction of Ar gas (Ar flow rate: 300 sccm) during the sputtering treatment, and using solid carbon as the target at a sputtering power of 8.19 kW. An evaluation battery was built using the positive electrode collector that had been prepared, and the battery discharge properties were evaluated. As a comparative example, a battery was built under the same conditions using a 0 nm thick positive electrode collector (that is, a positive electrode collector with no DLC film formed on it) and a positive electrode collector with a 100 nm thick DLC film, and the discharge properties were investigated. The various structural components of the battery other than the positive electrode collector were prepared in the same manner as conventional well known battery structural components in the field of secondary cell production.

The results are given in FIGS. 4A through 4D. In the figures, the horizontal axis indicates the capacity density (mAh/g), and the vertical axis represents the voltage (V).

Figure 4A:
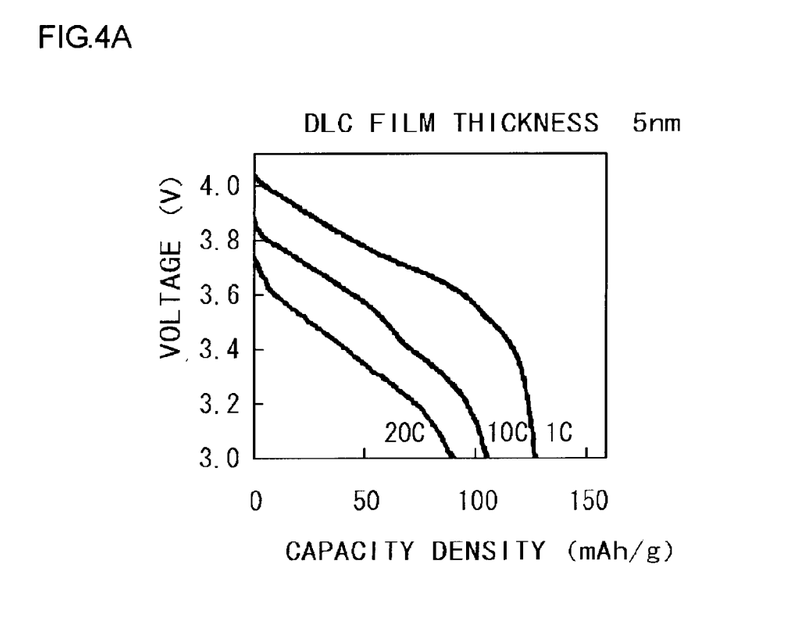
FIG. 4A illustrates the discharge properties of a cell employing a positive electrode collector with a DLC film (5 nm thick) in one embodiment of the invention.
Figure 4B:
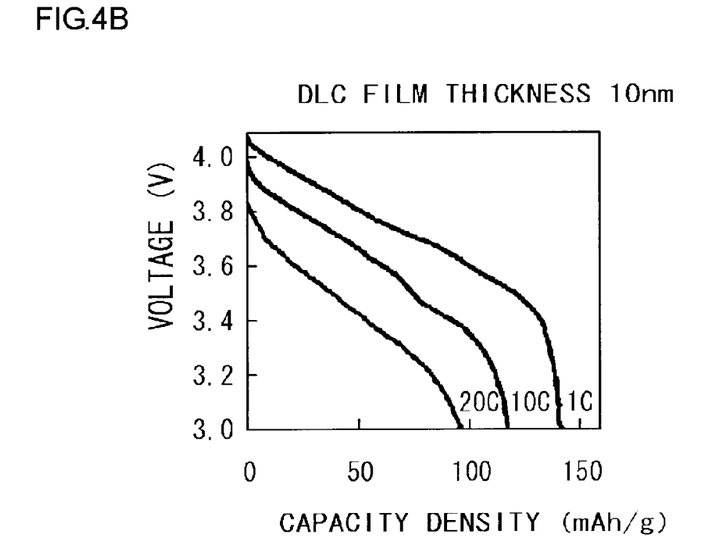
FIG. 4B illustrates the discharge properties of a cell employing a positive electrode collector with a DLC film (10 nm thick) in one embodiment of the invention.

The batteries in FIG. 4A (5 nm film thickness) and in FIG. 4B (10 nm film thickness) exhibited a capacity density of about 130 mAh/g at a discharge rate of 1 C, maintained a capacity density of 100 to 130 mAh/g at a discharge rate of 10 C, and were able to maintain a capacity density of 80 to 100 mAh/g at an extremely high current density characterized by a discharge rate of 20 C, with no significant decrease in capacity. That is, it was confirmed that a battery with better high rate properties can be built using a DLC film not thicker than 10 nm.

Figure 4C:
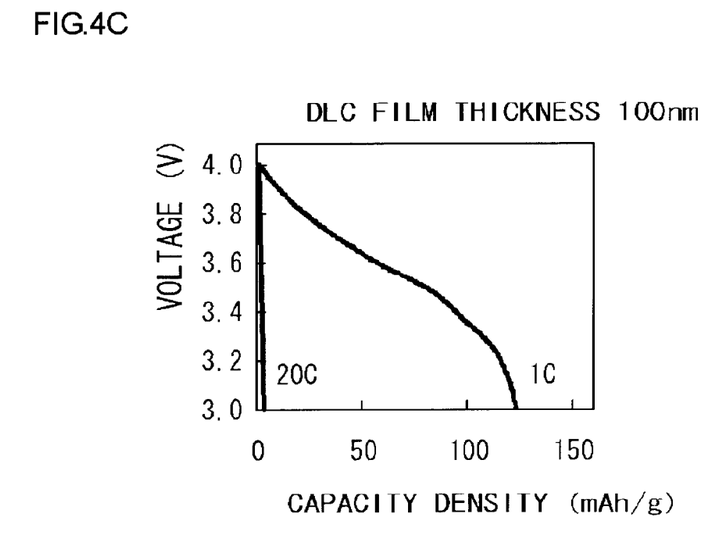
FIG. 4C illustrates the discharge properties of a cell employing a positive electrode collector with a DLC film (100 nm thick)

By contrast, the battery in the comparative example in FIG. 4C (100 nm film thickness) exhibited a capacity density of about 130 mAh/g at a discharge rate of 1 C, which was about the same as the batteries in FIG. 4A (5 nm film thickness) and FIG. 4B (10 nm thickness), but at a discharge rate of 20 C, the voltage decreased precipitously immediately after the start of discharge, and was incapable of discharge.

This was because a DLC film thickness of 100 nm does not provide any advantage in improving conductivity based on tunneling effects, resulting in a significant voltage drop due to internal resistance in the battery.

Figure 4D:
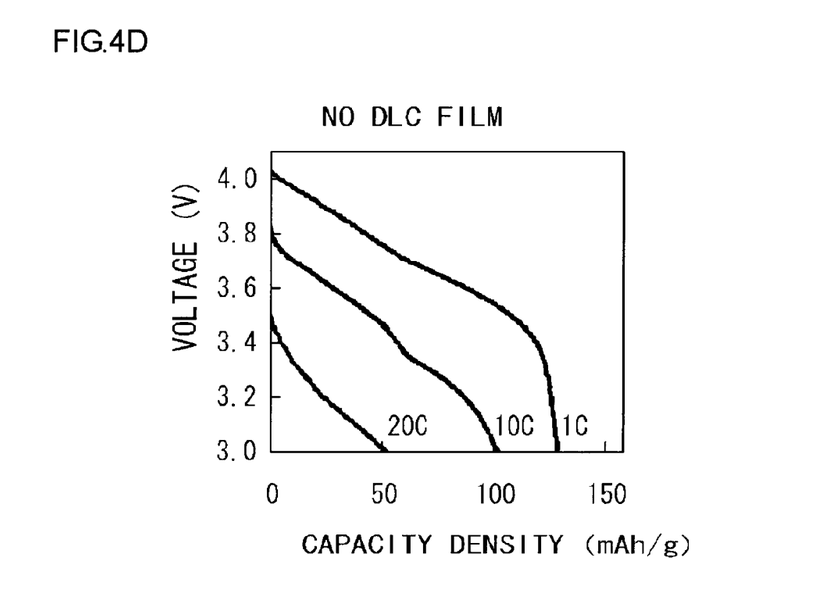
FIG. 4D illustrates the discharge properties of a cell employing a positive electrode collector without a DLC film.

The battery in the comparative example in FIG. 4D (0 nm film thickness, no DLC film) exhibited a capacity density of about 130 mAh/g at a discharge rate of 1 C, and maintained a capacity density of 100 mAh/g at a discharge rate of 10 C, but the capacity density fell to 50 mAh/g at an extremely high current density characterized by a discharge rate of 20 C. This may have been because the surface of the aluminum foil, which was not protected by a DLC film, was corroded or oxidized, resulting in greater resistance between the aluminum foil and positive electrode mix layer.

The following test was conducted to confirm that corrosion of the base is prevented by coating the surface of the conductive metal (base 10) with the DLC film. That is, a DLC film was formed using a common sputtering device on 10 cm*10 cm (100 cm$^2$) aluminum foil as the base. The conditions included setting a constant gas pressure of 0.3 Pa through the introduction of Ar gas during the sputtering treatment, and using solid carbon as the target at a sputtering power of 8.19 kW. The DLC film was also adjusted to a thickness of 5 nm by changing the base feed rate. The aluminum foil covered by the DLC film was then immersed for 5 min in a 1 mol/L lithium hydroxide solution, and the level of hydrogen gas produced by corrosion (that is, the reaction between the aluminum foil and the lithium hydroxide) was measured. As a comparative example, a test was conducted under the same conditions using aluminum foil which was not covered by a DLC film.

As a result, 428 mL hydrogen gas was produced from the aluminum foil which was not covered by a DLC film, whereas 12 mL hydrogen gas was produced from the aluminum foil that was covered by the DLC film. This confirmed that covering the surface of the conductive metal (base 10) with the DLC film prevented the base from being corroded.

The following test was furthermore conducted to confirm that the wettability of the DLC film is improved by hydrophilization treatment. That is, a DLC film was formed on the surface of aluminum foil as the base using a common sputtering device at an atmospheric pressure of 0.3 Pa and a sputtering power of 8.19 kW, with solid carbon as the target. A corona discharge treatment was then performed at atmospheric pressure using a common corona discharge treatment device while a gas mixture containing $N_2$, $H_2$, and a hydrocarbon gas (such as methane) in a volumetric ratio ($N_2$:$H_2$:hydrocarbon gas) of 99:0.5:0.5 was supplied on the DLC film surface. The corona discharge conditions comprised a discharge output of 50 to 2666 W*min/m$^2$ and a feed rate of 8.5 m/min.

Drops of water were allowed to adhere to the DLC film immediately after being formed by sputtering and on the DLC film following the corona discharge treatment (hydrophilic surface). The static contact angle of the water was lower on the hydrophilic surface than on the DLC film immediately after sputtering. In this test, the angle of contact of the water decreased from 65.2 degrees to less than 20 degrees. The results confirmed that the above hydrophilization treatment introduced hydrophilic (polar) functional groups containing nitrogen atoms into the film surface, resulting in obviously better wettability with water.

Figure 5:
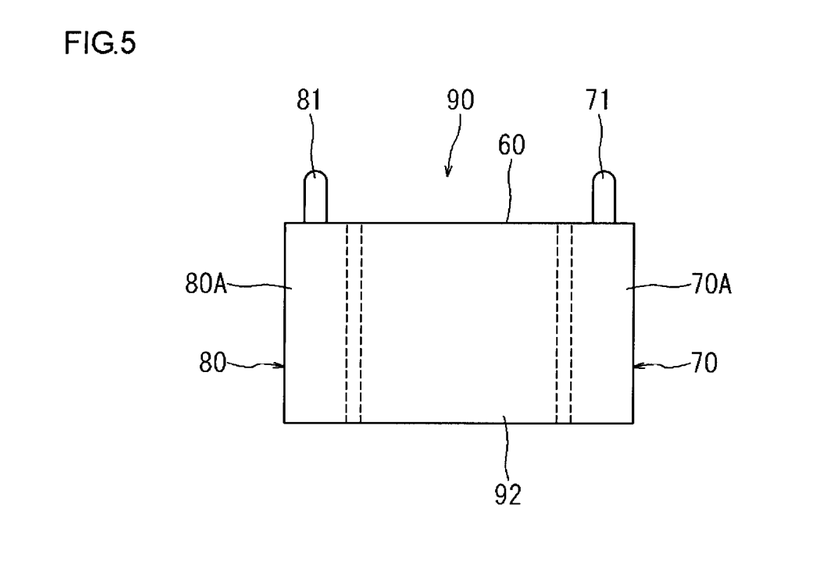
FIG. 5 is a plan schematically illustrating an example of a rolled electrode assembly in one embodiment of the invention.
Figure 6:
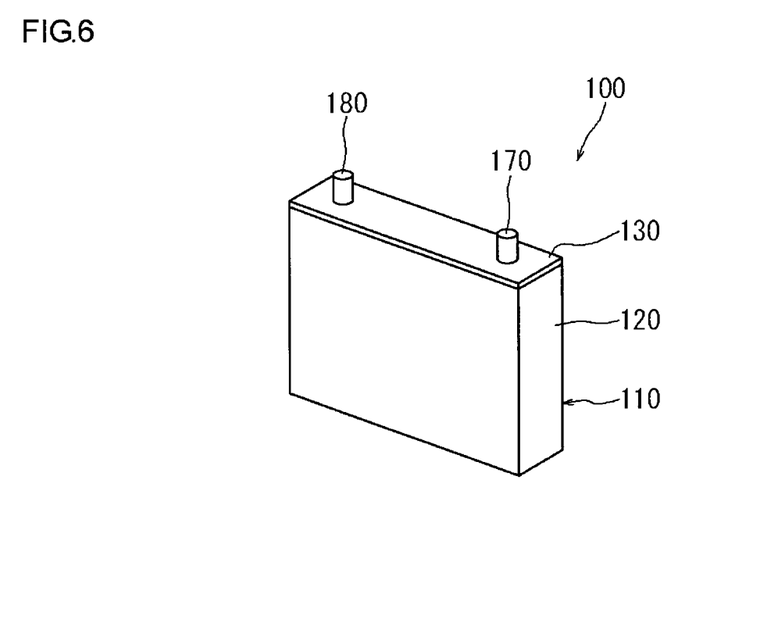
FIG. 6 is a perspective view schematically illustrating the secondary cell in one embodiment of the invention.

An embodiment of a lithium ion battery constructed using the sheet positive electrode 70 (see FIG. 1 and FIG. 3E) prepared by the method of the invention will be described with reference to the schematic illustrations of FIGS. 5 and 6.

As illustrated, the lithium ion battery 100 in this embodiment is equipped with a metal (reins and laminated film are also suitable) case 110. The case (outer container) 110 is equipped with a case body 120 in the form of a flat rectangular parallelepiped that is open at the upper end, and a lid 130 for closing the opening. A positive electrode terminal 170 electrically connected to the positive electrode of a rolled electrode assembly 90 and a negative electrode terminal 180 electrically connected to the negative electrode of the electrode assembly are provided on the upper surface of the case 110 (that is, the lid 130). The interior of the case 110, for example, houses a flat, rolled electrode assembly 90 which is produced when a continuous sheet-shaped positive electrode (positive electrode sheet) 70 and continuous sheet-shaped negative electrode (negative electrode sheet) 80 are laminated and rolled along with a total of two continuous sheet-shaped separators (separator sheets) 60, and the resulting roll is laterally flattened.

The positive electrode sheet 70 and negative electrode sheet 80 have a structure in which electrode mix layers based on an electrode active material are provided on both sides of continuous sheet-shaped electrode collectors. At one end in the widthwise direction of the electrode sheets 70 and 80 are formed portions with no electrode mix layers on either surface. During the above lamination, the positive electrode sheet 70 and negative electrode sheet 80 are laminated while slightly offset in the widthwise direction so that the portions with no positive electrode sheet 70 mix layer and no negative electrode sheet 80 mix layer protrude from both sides in the widthwise direction of the separator sheets 60. As a result, the portions of the positive electrode sheet 70 and negative electrode sheet 80 that have no electrode mix layer will protrude outward from the rolled core portion 92 (that is, the portion where the part of the positive electrode sheet 70 with no positive electrode mix layer and the part of the negative electrode 80 with no negative electrode mix layer are tightly rolled with the two separator sheets 60) in the lateral direction relative to the direction in which the rolled electrode assembly 90 is rolled. A positive electrode lead terminal 71 and negative electrode lead terminal 81 are attached to the protruding part 70A on the positive electrode side (that is, the part where no positive electrode mix layer is formed) and to the protruding part 80A on the negative electrode side (that is, the part where no negative electrode mix layer is formed), and are electrically connected to the above positive electrode terminal 170 and negative electrode terminal 180.

In this embodiment, the structural elements other than the positive electrode sheet 70 forming the rolled electrode assembly 90 are the same as in conventional lithium ion battery electrodes, and are not particularly limited. For example, a negative electrode mix layer based on a negative electrode active material for lithium ion batteries can be applied onto a continuous negative electrode collector to form the negative electrode sheet 80. Copper foil or another metal foil suitable for negative electrodes is suitable for use as the negative electrode collector. One or more materials conventionally used in lithium ion batteries can be used without limitation for the negative electrode active material. Suitable examples include carbonaceous materials such as graphite carbon and amorphous carbon, lithium-transition metal compound oxides (such as lithium-titanium compound oxides), and lithium-transition metal compound nitrides. For example, a suitable negative electrode 80 can be obtained by forming a graphite-based negative electrode mix layer (such as 98 mass % graphite, 1 mass % styrene butadiene rubber, and 1 mass % carboxymethyl cellulose) in the usual manner in the designated area on the surface of continuous copper foil as the collector.

Suitable examples of separator sheets 60 used between the positive and negative electrode sheets 70 and 80 include those made of a porous polyolefin resin. For example, porous separator sheets made of a synthetic resin (for example, a polyolefin such as polyethylene) about 5 to 30 micrometers (um) thick (such as 25 um) are suitable for use. There may also be no need for separators when a solid electrolyte or gelatinous electrolyte is used as the electrolyte (that is, the electrolyte itself can function as a separator in such cases).

The rolled electrode assembly 90 is housed inside the main body 120 through the opening in the upper end of the case main body 120, a suitable liquid electrolyte or solid (or gelatinous) electrolyte, here, a suitable non-aqueous electrolyte (for example, a non-aqueous electrolyte such as a solvent mixture of ethylene carbonate and diethyl carbonate containing a suitable amount of a lithium salt (support salt) such as $LiPF_6$), is disposed (injected) in the case main body 120, and the opening is sealed by welding the lid 130 or the like, completing the structure (assembly) of the lithium ion battery 100 in this embodiment. The process for sealing the case 110 and introducing the electrolyte (injection) may be the same as in the manufacture of conventional lithium ion batteries, and are not features of the invention.

Figure 7:
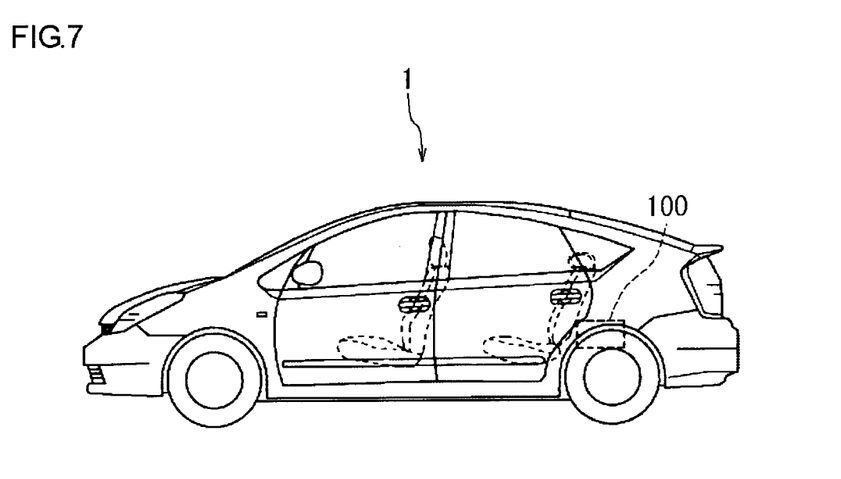
FIG. 7 is a side view schematically illustrating a vehicle (automobile) equipped with the secondary cell in one embodiment of the invention.

The battery of the invention (such as a lithium ion battery) has more consistent quality, as noted above, and is thus particularly suitable for use as a power source for motors (electric motors) in vehicles such as automobiles. The present invention therefore provides a vehicle (typically an automobile, particularly an automobile equipped with an electric motor, such as hybrid automobiles, electric automobiles, and fuel cell automobiles) 1 that is equipped with such a battery (typically a group of multiple batteries arranged in series) 100, as schematically illustrated in FIG. 7.

Although the invention was illustrated in preferred embodiments above, the invention is capable of modifications, and is, of course, not limited by these descriptions. For example, the invention is applicable without positive and negative distinctions. Negative electrode sheets may comprise a negative electrode collector composed through the application of the invention. That is, a negative electrode collector can be constructed from a base that is based on a conductive metal (such as copper) and a DLC film not thicker than 10 nm covering the surface of the base. The DLC film may have a hydrophilic surface on which hydrophilic functional groups are present. The structure of such a negative electrode sheet may afford the same action and effects as the positive electrode sheet described above.

INDUSTRIAL APPLICABILITY

According to the structure of the invention, it is possible to provide an electrode collector for batteries in which the base surface is protected and which has better collector performance in relation to the electrode mix layer.

The invention claimed is:

1. A method for producing a positive electrode for a lithium secondary battery, comprising:
   preparing a base mainly composed of a conductive metal;
   forming a diamond-like carbon film not thicker than 10 nm and not thinner than 0.8 on the surface of the prepared base;
   hydrophilizing a surface of the diamond-like carbon film by introducing hydrophilic functional groups to the surface of the formed diamond-like carbon film in an atmosphere including a nitrogen source gas to obtain a hydrophilic surface;
   preparing an aqueous composition for forming a positive electrode mix layer, wherein the aqueous composition contains a lithium transition metal compound oxide to function as a positive electrode active material and an aqueous dispersion medium; and
   applying the aqueous composition onto the hydrophilic surface of the diamond-like carbon film and drying the aqueous composition at 70 to 200° C. to remove the aqueous dispersion medium in the aqueous composition for forming the positive electrode mix layer, wherein the removal of the aqueous dispersion medium from the aqueous composition results in the formation of the positive electrode mix layer.

2. The method for producing a positive electrode according to claim 1, wherein the diamond-like carbon film is formed by physical deposition or chemical deposition of carbon on the base in the film-forming.

3. The method for producing a positive electrode according to claim 1, wherein at least one selected from the group consisting of amide groups, amino groups, and imide groups is introduced as the hydrophilic functional group.

4. The method for producing a positive electrode according to claim 1, wherein aluminum or an aluminum alloy is used as the conductive metal.

5. The method for producing a positive electrode according to claim 1, wherein the diamond-like carbon film is formed by sputtering deposition of carbon on the base in the film-forming.

6. The method for producing a positive electrode according to claim 1, wherein the diamond-like carbon film is subjected to corona discharge in the hydrophilization treatment.

7. The method for producing a positive electrode according to claim 1, wherein the aqueous composition is an alkaline solution prepared by elution of a lithium ion which constitutes the lithium transition metal compound oxide into the aqueous dispersion medium.

8. The method for producing a positive electrode according to claim 1, wherein the hydrophilization treatment is performed so that a static contact angle of water on the hydrophilic surface of the diamond-like carbon film is 20° or less.

9. The method for producing a positive electrode according to claim 1, wherein the diamond-like carbon film is formed to have a thickness of at least 4 carbon atoms.

* * * * *